INVENTOR.
GEORGE AINSWORTH.
BY
J. O. Clayton
ATTORNEY.

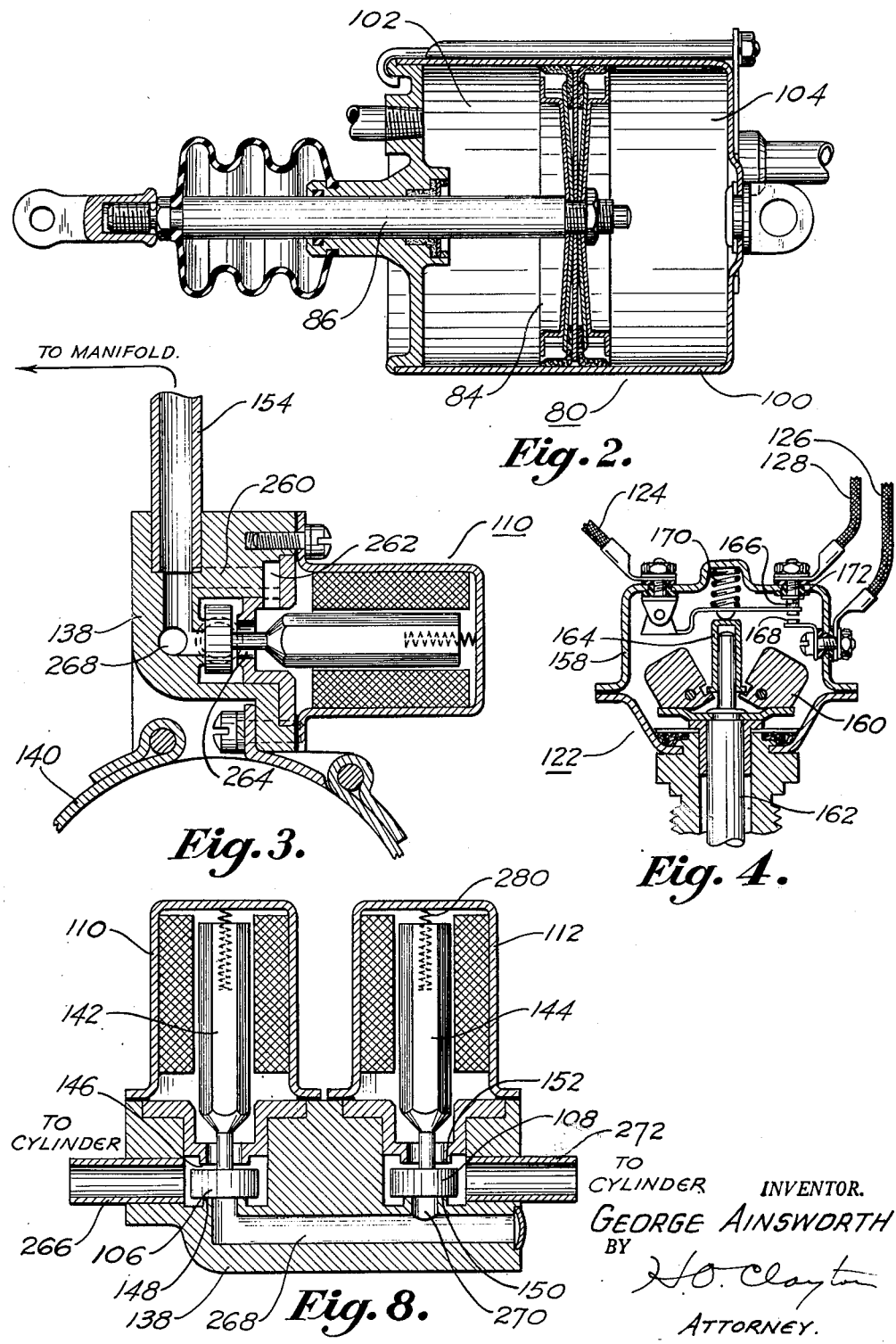

Inventor
GEORGE AINSWORTH.
By H.O. Clayton
Attorney

Patented Apr. 14, 1953

2,634,837

UNITED STATES PATENT OFFICE 2,634,837

TRANSMISSION OPERATING MECHANISM

George Ainsworth, Detroit, Mich., assignor to Bendix Aviation Corporation, South Bend, Ind., a corporation of Delaware Application June 7, 1946, Serial No. 675,139

17 Claims. (Cl. 192—.073)

1

This invention relates in general to the power transmission mechanism of an automotive vehicle and in particular to means for operating the change-speed transmission of said mechanism.

One of the principal objects of my invention is to provide, in an automotive vehicle including a fluid coupling, a friction clutch and three-speeds forward and reverse transmission, a mechanism, power operated in part, for operating said transmission; and said mechanism, at the option of the driver, is either manually operated to effect any one of the four settings of the transmission or power operated to effect the second and high gear settings of said transmission the friction clutch being power operated to facilitate the latter operations.

A further object of my invention is to provide, in an automotive vehicle including a fluid coupling, a friction clutch and a three-speeds forward and reverse transmission, means for operating and for facilitating the operation of said transmission said means including power means, comprising a double acting motor, which is automatically operable, after the accelerator is released, to establish the transmission either in its second gear setting or its high gear setting depending upon the speed of the vehicle, the friction clutch being operated by said motor to facilitate this operation of the transmission, said transmission and clutch operating means further including manually operated means for effecting any one of the gear settings of the transmission.

Yet another object of my invention is to provide, in the power plant of an automotive vehicle including a friction clutch, a fluid coupling and a three-speeds forward and reverse transmission, means for effecting a sequential operation of the clutch and the transmission, said means including a double acting motor operably connected to both the clutch and transmission said motor being controlled by an accelerator operated switch and a vehicle speed responsive governor operated switch.

A further object of my invention is to provide, in an automotive vehicle provided with a friction clutch and a change gear transmission, a relatively simple means interconnecting said clutch and transmission with the power element of a double acting pressure differential operated motor the parts of said connecting means being so constructed and arranged and so operative that energization of said motor results in disengagement of the clutch immediately followed by a gear changing operation of the transmission the latter operation being then followed by a re-engagement of the clutch.

2

Other objects of the invention and desirable details of construction will become apparent from the following detailed description of a preferred embodiment of the invention described in the specification to follow and disclosed in the accompanying drawings, in which:

Figure 2 is a longitudinal sectional view of the double acting differential pressure motor of my invention;

Figure 3 is a sectional view taken on the line 3—3 of Figure 1, disclosing details of the control valve mechanism of the motor unit of Figure 2;

Figure 4 is a sectional view disclosing details of the governor operated switch mechanism constituting a part of the control means of my invention;

Figure 8 is a sectional view taken on the line 8—8 of Figure 1, disclosing other details of the control valve mechanism of the motor unit of my invention.

Figure 1:
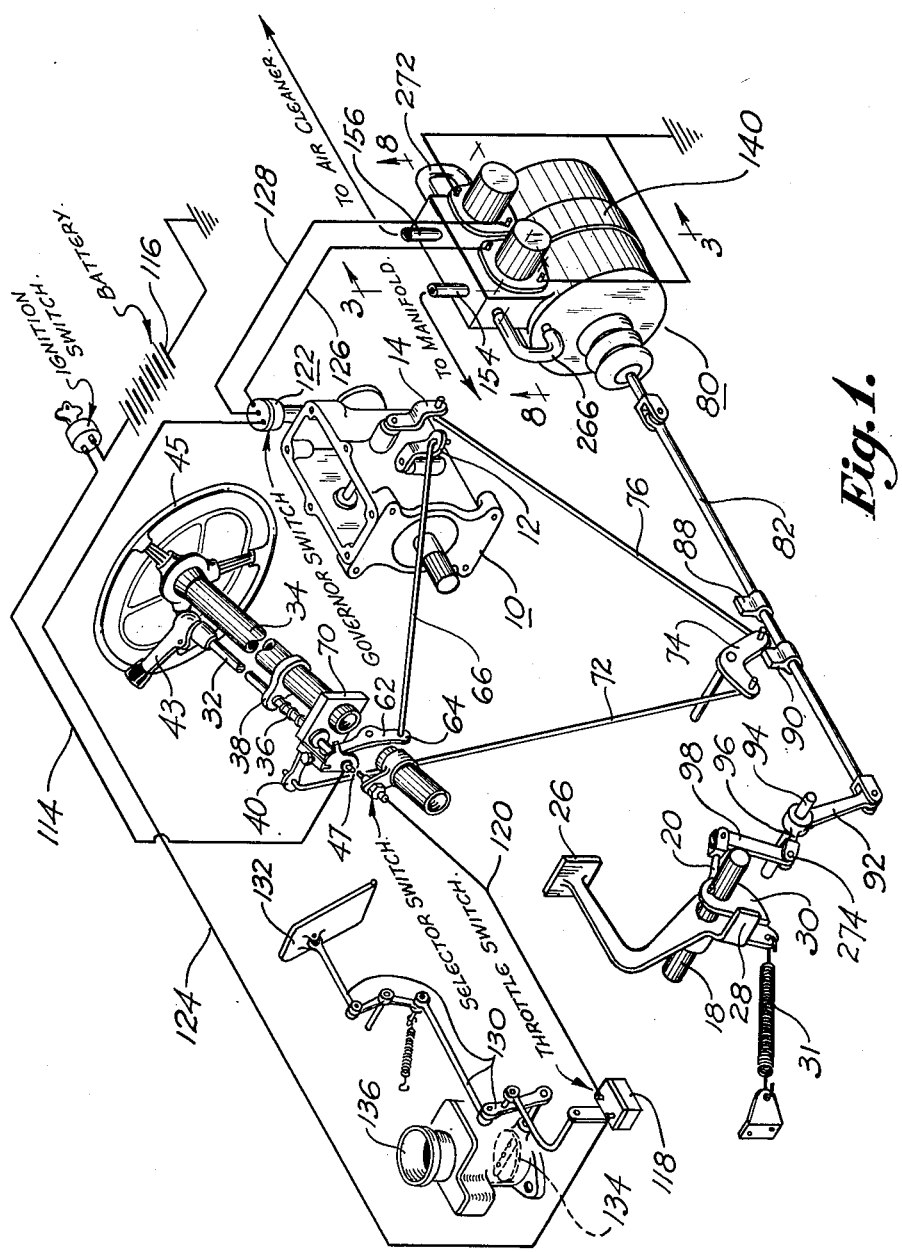
Figure 1 is a diagrammatic view disclosing the principal features of the clutch and transmission operating mechanism constituting my invention.

Referring now to Figure 1 disclosing a preferred embodiment of my invention, a three-speeds forward and reverse transmission 10, preferably that used in one of the 1942 automotive vehicles, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14 and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings.

A feature of the mechanism disclosed in Figure 1 lies in the combination of a fluid coupling, such e. g. as that which was incorporated in several 1941 and 1942 passenger vehicles, with the aforementioned mechanism which operates the transmission and friction clutch; and said coupling, which is preferably incorporated in the power plant between the engine and the friction clutch, includes an impeller and a vaned rotor, the latter serving to drive the aforementioned driving plate of the clutch.

The friction clutch is operably connected to a clutch throw out shaft 18 to which is secured a crank member 20. The conventional manually operated clutch pedal 26 is rotatably mounted on the shaft 18 and a flange member 28 extending laterally from the clutch pedal contacts a crank 30 keyed to said shaft. It is apparent, therefore, that a counter-clockwise rotation of the crank 20 serves to effect a disengagement of the clutch, the clutch pedal, which is held in its clutch disengaged position by a spring 31, remaining stationary during the operation. It is also apparent that a manual operation of the clutch pedal serves, through the intermediary of the crank 30, to effect a disengagement of the clutch.

The shift rail operating cranks 12 and 14 are actuated by force transmitting means including a rotatable and bodily movable shaft 32 extending alongside the steering column 34 of the vehicle. As is disclosed in Figures 1, 5 and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32, which incidentally was used on one of the 1942 automotive vehicles, is also such that the cross-shift movement of the shift lever, that is the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42 said mechanism includes a member 44 sleeved over the lower end of the shaft 32, said member being permanently secured, as by brazing, to the crank 40. The lower end portion of the member 44 is provided with a flange 46 which is recessed at 48, Figure 5, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool-shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68, Figure 6, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 43 upwardly in a plane perpendicular to the plane of the steering wheel; and this operation serves to rotate the bell-crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell-crank lever 74 and a link 76.

There is thus provided, by the above described mechanism, means for manually operating the transmission 10; and in this manual operation of the transmission the shift lever 43 is movable to five different positions, said selective movement outlining the letter H.

One feature of my invention lies in the power means for operating the transmission and clutch said means being diagrammatically disclosed in Figure 1. The principal element of this power means consists of double-acting fluid pressure motor 80 operably connected to the clutch throwout shaft 18 and to the shift rail operating crank 14 by force transmitting means said means constituting the essence of my invention.

Describing now this force transmitting means, the same includes a rod 82 operably connected to the piston 84 of the motor 80 by a rod 86 the rod 82 having secured thereto two spaced apart striker arms 88 and 90 adapted to rotate the bell-crank lever 74 to establish the transmission either in its second gear setting or its high gear setting. To the outer end of the rod 82 there is pivotally secured a bell-crank lever 92 which is pivotally mounted on a shaft 94; and the upper end of an arm 96 of said lever is pivotally connected to a link 98 which is pivotally connected at its upper end to the outer end of the crank 20. There is thus provided, by this linkage, a toggle mechanism to operate the clutch.

Describing now the means for controlling the operation of the motor 80 said means includes the control valve mechanism disclosed in Figures 3 and 8 and electrical mechanism for controlling the operation of said valve mechanism. The motor 80 is disclosed in Figures 1 and 2 of the drawings and includes a double ended casing 100 housing the aforementioned piston 84 said piston and cylinder outlining compartments 102 and 104; and said compartments are adapted, as will be more fully described hereinafter, to be alternately connected to a source of vacuum, preferably the intake manifold of the internal combustion engine of the vacuum and to the atmosphere by means of power operated three-way valves including the valve members 106 and 108, Figure 8. Grounded solenoids 110 and 112, which control the operation of said three-way valves, are controlled by the aforementioned selector switch 47 which is electrically connected, by wire 114 and an ignition switch, to a grounded battery 116. An accelerator operated breaker switch 118 is electrically connected, by a wire 120, to the switch 47, and a governor operated switch 122, disclosed in detail in Figure 4, is electrically connected to the switch 118 by a wire 124. The governor switch 122 is electrically connected to solenoids 110 and 112 by wires 126 and 128 respectively. As to the accelerator operated switch 118 said switch is operably connected by linkage 130 to the accelerator 132 of the vehicle said linkage also serving to actuate the throttle valve 134 of the carburetor 136 of the vehicle.

As shown in Figures 3 and 8 the valve mechanism comprises a casing 138 to which are secured the solenoids 110 and 112; and this casing is preferably detachably secured to the motor casing 100 by means of a band 140. To the armatures 142 and 144 of the aforementioned solenoids there are secured the valves 106 and 108 respectively, the valve 106 being adapted to seat at 146 and 148 and the valve 108 at 150 and 152 to alternately connect the motor 80 with the vacuum or atmosphere. Briefly describing the pneumatic connections, a conduit 154 serves to interconnect an intake manifold of the internal combustion engine with the motor 80 and a conduit 156 interconnects said motor with an air cleaner, not shown.

Referring now to Figure 4 disclosing the details of the governor operated switch mechanism said mechanism includes a two-part casing 158 housing a centrifugally operated governor mechanism 160 which is drivably connected, by a shaft 162, to the propeller shaft of the vehicle or some other moving part of the power plant, the speed of which is directly proportional to the speed of the vehicle. A thrust member 164 of the centrifugal mechanism contacts the central portion of a movable switch contact member 166 which is biased into engagement with a fixed contact 168 by a spring 170. The parts of this switch mechanism are so constructed and arranged and so operative that when the vehicle is at a standstill or is travelling at or below a relatively low speed, for example 10 M. P. H., then the spring 170 serves to move the movable contact member 166 into engagement with the fixed contact 168; and when the vehicle is travelling above governor speed, that is the aforementioned 10 M. P. H., then the centrifugally operated mechanism 160 is operative, as is disclosed in Figure 4, to force the contact 166 into engagement with a fixed contact member 172. Completing the description of the governor operated switch mechanism 122, the other end of the movable contact member 166 is electrically connected to the wire 124 which is connected to the accelerator operated switch 118.

Describing now the complete operation of the mechanism of my invention, and incidentally completing the description of the parts of said mechanism not heretofore described, it will be assumed that the three-speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 26 to disengage the clutch and will then operate the shift lever 43 to manually effect said setting. The accelerator will then be depressed as the clutch is reengaged to get the car under way; and after the desired car speed is reached, the clutch pedal and shift lever are again operated to establish the transmission in its second gear setting. The car being then under way in second gear and at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 43, which at the time is in its second gear setting, is pushed downwardly away from the steering wheel that is angularly in a clockwise direction in a plane perpendicular to the plane of the steering wheel; and this operation serevs to bodily move the shaft 32 downardly until a movable contact member 224, Figure 5, of the selector switch 47 is in contact with a fixed contact 226 of said switch to close the same. This operation effects a declutching operation of the clutch mechanism 42, the clutch member 52 moving away from the clutch member 44 the movement of the latter being prevented by the stop 68.

Figure 5:
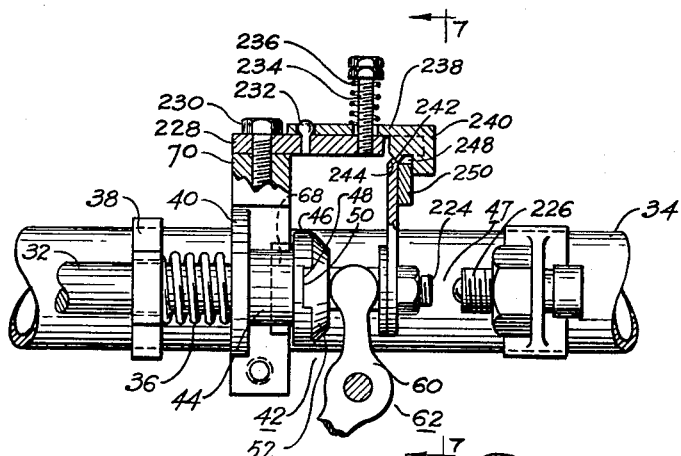
Figure 5 is an enlarged view of the mechanism at the base of the steering column said mechanism serving to disconnect the shift lever from the power operated transmission operating linkage.
Figure 6:
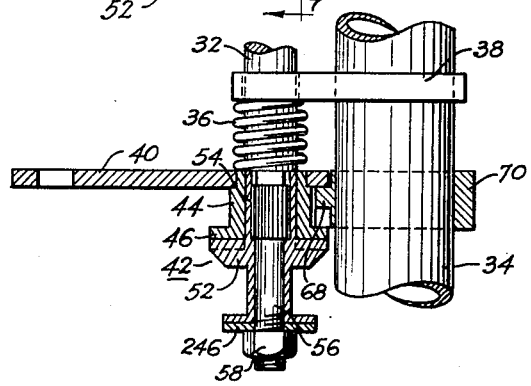
Figure 6 is a sectional view, taken on the line 6—6 of Figure 7, disclosing certain features of the mechanism disclosed in Figure 5.
Figure 7:
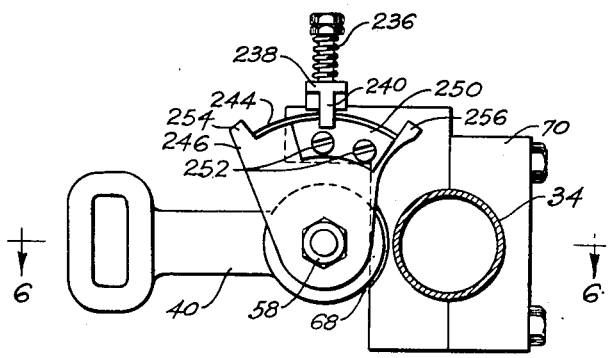
Figure 7 is a front view, taken on the line 7—7 of Figure 5, of the mechanism disclosed in Figure 5.

Referring to Figures 5 and 7 there is disclosed a latch mechanism for holding the shift lever in its automatic position, said mechanism including a relatively narrow rectangular shaped support member 228 preferably detachably secured to the bracket member 70 by a bolt 230; and there is mounted on said support member, by means of a guide pin 232, a bolt 234 and a spring 236, a movable latch member 238 shaped at its outer end to provide a relatively narrow stop member 240. Now when the shift lever 43 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56, Figure 6, between the lower flange portion of the clutch member 52 and the nut 58; and this operation serves to position said peripheral edge portion 244 in the space indicated by the reference numeral 248, Figure 5. Incidentally the shift rail selecting mechanism of the transmission and the cooperating transmission parts are so constructed that the crank 62 is moved beyond its second and high shift rail selective position in effecting the above described automatic setting of the shift lever.

Now at this juncture it is to be noted, from an inspection of Figure 7, that a rectangular shaped stop member 250, secured to the outer face of the stop member 246 by screws 252, is in contact with the member 240 when the parts are in their transmission neutral position and when the spring 36 has operated to move the crank 12 to its second and high shift rail position, that is the position preparing the transmission for either second or high gear operation. It follows therefore that the stop member 246 must be rotated clockwise in Figure 7 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 7 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Continuing the description of the operation of the mechanism the driver having moved the shift lever to its automatic position and assuming that the car is travelling above governor speed to close the switch 166, 172, Figure 4, the transmission will be automatically established in its high gear setting after the driver releases the accelerator to close the switch 118; for with this operation an electrical circuit is completed via the grounded battery 116, the ignition switch, the then closed selector switch 47, the then closed accelerator operated switch 118, the switch 166, 170 of the governor operated switch 122 and the grounded solenoid 112. The resulting operation of the valve 108 effects an energization of the motor 80 the piston 84 of the latter being then subjected to a differential of pressures to move the same to the right, Figure 1; for the compartment 102 of the motor 80 is then vented to the atmosphere via the duct 156, Figure 1, leading to an air cleaner, not shown, a duct 260, Figure 3, in the body portion of the valve casing 138, a recess 262 in said body portion, a port 264, and a conduit 266; and the compartment 104 of the motor is connected to the intake manifold of the engine of the vehicle or other sources of vacuum by means of the duct 154, Figure 1, connected to said source of vacuum, a duct 268 in the valve casing, a port 270 in said casing and a conduit 272.

The above described movement of the piston 84 effects a movement of the rod 82 to the right to move the parts of the mechanism to the position disclosed in Figure 1. In this operation the clutch is first disengaged and the transmission is then shifted from its second gear setting to its high gear setting the clutch being reengaged as the latter setting is being established. In this operation the first increment of movement of the rod 82 results in an operation of the lever 92 to rotate the crank 20 to disengage the clutch that is separate the driving and driven plates thereof sufficiently to interrupt the drive from the engine to the drive shaft of the vehicle. Continued movement of the rod 82 results in a movement of the striker arm 90 into contact with the lever 74 to demesh the gears of the transmission which establish the same in its second gear setting; and in this operation the rotation of the crank 20 is continued thereby increasing the separation of the clutch plates. Continued rightward movement of the rod 82 as the piston 84 continues its movement toward the right end of the motor 80 effects a meshing of the high speed gears of the transmission to establish the same in its high gear setting; and as this operation is being effected a pivotal connection 274 of the toggle mechanism 96, 98 moves past its dead center position and subsequent rotation of the lever 92 results in a clockwise rotation of the crank 20 to reengage the clutch. There is thus automatically effected a shift of the transmission from its second to its high gear setting when the vehicle is travelling above governor speed to close the switch 166, 172 and the driver releases the accelerator to close the switch 118 and moves the selector lever to its automatic setting to close the switch 47.

Thereafter when the speed of the vehicle is reduced below the governor speed, that is the speed resulting in a closing of the switch 166, 168 and an opening of the switch 166, 172, and the driver releases the accelerator to close the switch 118, then the solenoid 112 is de-energized to make possible a closing of the valve 108 by a spring 280 and the solenoid 110 is energized to open the valve 106; and this operation results in an energization of the motor 80 to move the piston 84 to the left, Figure 1, to again establish the transmission in its second gear setting the clutch being operated to facilitate this operation. In this operation the striker arm 88 actuates the lever 74 after the clutch is disengaged; and said actuation of the lever 74 and operation of the toggle mechanism 96, 98 effects a neutralization of the transmission followed by a second gear setting of the transmission and a concurrent reengagement of the clutch. Incidentally with both of the above described power operations of the transmission and clutch the fluid coupling in the power plant cooperates to facilitate said operations, that is cooperates to effect a smooth operation of the power plant of the vehicle. If the vehicle is brought to a stop, the transmission being then established in its second gear setting, the fluid coupling will prevent the engine from stalling despite the then existing engagement of the friction clutch; and thereafter said coupling, by virtue of its slipping operation, will make possible a smooth start of the vehicle from rest it being remembered that the transmission is at the time established in its second gear setting.

There is thus provided, by the clutch and transmission operating mechanism of my invention, a mechanism controlled by an operation of a vehicle speed responsive governor, the accelerator and the shift lever of the vehicle, said mechanism serving, when manually operated, to operate the clutch and establish the transmission in any one of its four settings; and when power operated said mechanism serves to alternately establish the transmission in its second and high gear settings said operations being facilitated by an operation of the clutch and the fluid coupling of the power plant. As to said power operation of the mechanism the driver needs but release the accelerator to initiate the desired cycle of operations of the clutch and transmission. To return the control of the mechanism from its motor operated second and high gear operations to a manual control of the mechanism, the driver will rotate the shift lever 43 upwardly, that is, toward the steering wheel; and this operation serves, when the transmission is established in its second gear setting, to return the stop member 246 to the position disclosed in Figure 5, that is, the position wherein the wedge-shaped peripheral edge portion 244 of said stop member lies to the left of the flange portion 242 of the member 238 as shown in said figure. The selector switch 47 is opened by this operation thereby disabling the power means preparatory to effecting a manual operation of the transmission. The clutch is then disengaged by a manual operation of the clutch pedal 26 and the transmission then established in any one of its high gear, low gear, or reverse gear settings depending upon the desire of the driver.

If a second gear setting of the transmission is desired when the transmission is established in its high gear setting and the shift lever is positioned in its automatic setting, then the driver will, after manually disengaging the clutch, first move the shift lever out of its automatic setting whereupon he will successively rotate the shift lever to its high gear position to mesh the clutch members 44 and 52, and then rotate said lever to its second gear position.

I claim:

1. In an automotive vehicle provided with a three-speeds forward and reverse transmission and a friction clutch, manually and power operated means for operating the transmission and for operating the clutch to facilitate said operation of the transmission, said means comprising a manually operated shift lever, transmission operating means extending from the casing of the transmission, a double acting pressure differential operated motor, force transmitting means, including means which may be manually operated to effect any one of the settings of the transmission, interconnecting the shift lever, the clutch, the aforementioned transmission operating means extending from the casing, and the power element of the motor, said force transmitting means being operable, when the motor is energized to effect one of its two operations, to successively disengage the clutch, change the setting of the transmission from its second gear setting to its high gear setting and then reengage the clutch; and means for controlling the operation of said motor.

2. In an automotive vehicle provided with an accelerator, a vehicle speed responsive governor, three-speeds forward and reverse transmission and a friction clutch; manually and power operated means for operating the transmission and for operating the clutch to facilitate said operation of the transmission, said means comprising a manually operated shift lever, transmission operating means extending from the casing of the transmission, a double acting pressure differential operated motor, and force transmitting means, including means manually operable to effect any one of the settings of the transmission, interconnecting the shift lever, the clutch, the power element of the motor and the aforementioned transmission operating means extending from the transmission casing, said force transmitting means being operable, when the motor is energized, to effect either one of its two power operations to successively disengage the clutch, change the setting of the transmission and then reengage the clutch, and means for controlling the operation of said motor including an accelerator operated switch and a switch operated by the aforementioned governor.

3. In an automotive vehicle provided with an accelerator, a vehicle speed responsive governor, a three-speeds forward and reverse transmission, a friction clutch and a fluid coupling incorporated, in the power plant of the vehicle, between said friction clutch and the internal combustion engine of the vehicle; manually and power operated means for operating the transmission and for operating the clutch to facilitate said operation of the transmission said means comprising a manually operated shift lever, two transmission operating cranks extending from the casing of the transmission, a double acting pressure differential operated motor, and force transmitting means, including means manually operable to effect any one of the settings of the transmission and further including a clutch operating toggle mechanism, interconnecting the shift lever, the clutch, the aforementioned transmission operating cranks and the power element of the motor, said force transmitting means being operable, when the motor is energized to effect one of its two operations, to successively disengage the clutch, change the setting of the transmission from its second gear setting to its high gear setting and then reengage the clutch, and means for controlling the operation of said motor including an accelerator operated switch, a switch operated by the aforementioned governor and a switch operated by the shift lever.

4. In an automotive vehicle provided with a three-speeds forward and reverse transmission and a friction clutch, manually and power operated means for operating the transmission and for operating the clutch to facilitate said operation of the transmission, said means comprising a manually operated shift lever, a double acting pressure differential operated motor, means for controlling the operation of said motor and force transmitting means interconnecting the shift lever, the clutch, the transmission and the power element of the motor, said force transmitting means including a clutch operating shaft, a crank secured to said shaft, a bell crank lever, a link interconnecting one end of said lever with the end of the crank to provide therewith a clutch operating toggle mechanism; and a rod interconnecting the other end of the bell crank lever with the power element of the motor.

5. In an automotive vehicle provided with a three-speeds forward and reverse transmission and a friction clutch, manually and power operated means for operating the transmission and for operating the clutch to facilitate said operation of the transmission said means comprising a manually operated shift lever, a double acting pressure differential operated motor, means for controlling the operation of said motor and force transmitting means interconnecting the shift lever, the clutch, the transmission and the power element of the motor said force transmitting means including means which may be manually operated to establish the transmission in any one of its settings and further including means interconnecting the power element of the motor with the clutch and operable, when the motor is energized, to actuate a portion of the aforementioned manually operated means to thereby establish the transmission in one or the other of two of its settings.

6. In an automotive vehicle provided with a three-speeds forward and reverse transmission and a friction clutch, manually and power operated means for operating the transmission and for operating the clutch to facilitate said operation of the transmission said means comprising a manually operated shift lever, a double acting pressure differential operated motor, means for controlling the operation of said motor and force transmitting means interconnecting the shift lever, the clutch, the transmission and the power element of the motor said force transmitting means including means, comprising two cranks extending from the transmission, which may be manually operated to establish the transmission in any one of its settings and further including means, comprising a clutch operating toggle mechanism, interconnecting the power element of the motor with the clutch and operable, when the motor is energized, to operate the transmission by acting upon a portion of the last-mentioned means to thereby establish the transmission in one or the other of two of its settings.

7. Manually and power operated means for operating the friction clutch and the change speed transmission of an automotive vehicle said means comprising a manually operated shift lever, a double acting motor including a casing and a power element therein, a plurality of transmission operating cranks, force transmitting means interconnecting the cranks and shift lever and operable, when the shift lever is actuated, to operate the transmission solely by the physical effort of the driver of the vehicle, together with force transmitting means, comprising a clutch operating crank alternately movable in one or the other of two directions to disengage and then reengage the clutch, actuated by the aforementioned motor and operable upon a portion of the aforementioned force transmitting means to effect a power operation of the transmission.

8. Manually and power operated means for operating the friction clutch and the change speed transmission of an automotive vehicle said means comprising a manually operated shift lever, a double acting motor including a casing and a power element therein, a plurality of transmission operating cranks force transmitting means, including a clutch mechanism operable when the shift lever is placed in a certain position to disconnect said lever from one of said cranks, interconnecting the cranks and shift lever and operable, when the shift lever is selectively actuated, to operate the transmission solely by the physical effort of the driver of the vehicle, together with force transmitting means, comprising a clutch operating crank alternately movable in one or the other of two directions, operable to effect certain operations of the transmission and to disengage and then reengage the clutch to facilitate said operations, said latter force transmitting means being actuated by the aforementioned motor and being operable upon a portion of the aforementioned force transmitting means.

9. In a drive for a motor vehicle provided with an internal combustion engine having an intake manifold and a throttle the combination of a variable speed ratio transmission having driving and driven elements therein, a first means adapted to change the speed ratio between said driving and driven elements, a housing having a cylinder therein, a piston slidably mounted in said cylinder, means for effecting movement of the piston by differential pressure and including a connection between said cylinder and said intake manifold, valve control means adapted to open and close said connection, the opening and closing of said valve control means being responsive to vehicle speed and throttle closing, a clutch adapted to drivingly connect and disconnect said engine from said transmission and having a control member, means connecting said piston and said clutch control member whereby movement of said piston disengages and engages said clutch and piston movement responsive means adapted to actuate said first means while said clutch is disengaged.

10. In a drive for a motor vehicle having an internal combustion engine provided with an intake manifold the combination of a variable speed ratio transmission having driving and driven elements therein and at least two alternately available speed ratio drives in said transmission, a clutch adapted to drivingly connect and disconnect said engine from said transmission, a housing having a cylinder therein, a piston slidably mounted in said cylinder, means for effecting a movement of the piston by differential pressure and including a connection between said cylinder and said intake manifold, means to cause motion of said piston to disengage said clutch, change the speed ratio drive in said transmission, and reengage said clutch, and vehicle speed responsive means to open and close said connection and manually controlled means to open and close said connection whereby movement of said piston is dependent upon concurrent operation of both said vehicle speed means and said manually controlled means.

11. In a drive for a motor vehicle having an internal combustion engine provided with a manifold and a throttle the combination of a variable speed ratio transmission having driving and driven elements therein and at least two alternately available speed ratio drives in said transmission, a clutch adapted to drivingly connect and disconnect said engine from said transmission, a housing having a compartment therein, a member mounted for movement in said compartment, means for effecting a movement of said member by differential pressure and including a connection between said compartment and said intake manifold, means to cause motion of said member to disengage said clutch, change the speed ratio drive in said transmission and reengage said clutch, a solenoid valve in said connection adapted to open said connection when said solenoid is energized, a source of electric energy, an electric circuit connecting said source and said solenoid, a vehicle speed responsive switch in said circuit, a switch in said circuit adapted to be closed when said throttle is urged toward the closed position, said switches being series connected whereby movement of said member is dependent upon the concurrent closing of said switches.

12. In a drive for a motor vehicle having an internal combustion engine provided with an intake manifold the combination of a transmission having driving and driven elements and having a variable first and a second speed ratio drive therein, a first means adapted to select said first or said second speed ratio drive between said elements, a clutch adapted to drivingly connect and disconnect said engine from said transmission, a housing having a compartment therein, a member mounted for movement in said compartment, an air tight connection between each end of said compartment and said manifold, valve means in said connections adapted to selectively open and close and vent said connections whereby air is alternately withdrawn from opposite sides of said member by manifold suction and said member is moved toward the corresponding one end of said compartment by differential pressure, means connecting said member with said clutch whereby movement of said member in either diretcion disengages and reengages said clutch, means connecting said member with said first means whereby movement of said member in one direction selects said first speed ratio drive and movement of said member in the other direction selects said second speed ratio drive and means to time the selection of said speed ratio drive during the interval when said clutch is disengaged.

13. In a drive for a motor vehicle having an internal combustion engine provided with an intake manifold and a throttle, the combination of a variable speed ratio transmission having driving and driven elements therein and a slidable shift rail, the direction of movement of which selects the speed ratio between driving and driven transmission elements, a clutch adapted to drivingly connect and disconnect said engine from said transmission, a housing having a compartment therein, a member mounted for movement in said compartment, an air tight connection between each end of said compartment and said manifold, valve means in said connections adapted to selectively open and close and vent said connections whereby the ends of said compartment alternately have air withdrawn therefrom by manifold suction and said member is moved toward one end of said compartment by differential pressure, means connecting said member with said clutch whereby movement of said member in either direction disengages and reengages said clutch, means connecting said member with said shift rail whereby movement of said member in one direction slides said shift rail in the direction to select a first speed ratio drive and movement of said member in the other direction slides said shift rail in the opposite direction to select a second speed ratio drive and means to time the movement of said shift rail to occur during the interval when said clutch is disengaged.

14. In a drive for a motor vehicle having an internal combustion engine provided with an intake manifold and a throttle the combination of a transmission having driving and driven elements and having a variable first and a second speed ratio drive therein, a first means adapted to select said first or said second speed ratio drive between said elements, a clutch adapted to drivingly connect and disconnect said engine from said transmission, a housing having a compartment therein, a member mounted for movement in said compartment, an air tight connection between each end of said compartment and said manifold, valve means in said connection adapted to selectively open and close and vent said connections whereby the ends of said compartment alternately have air withdrawn therefrom by manifold suction and said member is moved toward one end of said compartment by differential pressure, said valve means being responsive to vehicle speed and throttle closing, linkage connecting said member with said clutch whereby movement of said member in either direction disengages and reengages said clutch, means connecting said member with said first means whereby movement of said member in one direction selects said first speed ratio drive and movement of said member in the other direction selects said second speed ratio drive and means to time the selection of said speed ratio drive during the interval when said clutch is disengaged.

15. In a drive for a motor vehicle having an internal combustion engine provided with an intake manifold and a throttle the combination of a transmission having driving and driven elements and having a variable first and a second speed ratio drive therein, a first means adapted to select said first or said second speed ratio drive between said elements, a clutch adapted to drivingly connect and disconnect said engine from said transmission, a housing having a cylinder therein, a piston slidably mounted in said cylinder, an air tight connection between each end of said cylinder and said manifold, valve means in said connections adapted to selectively open and close and vent said connections whereby the ends of said cylinder alternately have air withdrawn therefrom by manifold suction and said piston is moved toward one end of said cylinder by differential pressure, means connecting said piston with said clutch whereby movement of said piston in either direction disengages and reengages said clutch, means connecting said piston with said first means whereby movement of said piston in one direction selects said first speed ratio drive and movement of said piston in the other direction selects said second speed ratio drive and means to time the selection of said speed ratio drive during the interval when said clutch is disengaged, said valve means being responsive to concurrent vehicle speed conditions and throttle closing conditions.

16. In a drive for a motor vehicle having an internal combustion engine provided with an intake manifold and a throttle the combination of a transmission having driving and driven elements and having a variable first and second speed ratio drive therein, a first means adapted to select said first or said second speed ratio drive between said elements, a clutch adapted to drivingly connect and disconnect said engine from said transmission, a housing having a cylinder therein, a piston slidably mounted in said cylinder, an air tight connection between each end of said cylinder and said manifold, a solenoid valve in each connection adapted to open said connection when said solenoid is energized and vent said cylinder when deenergized, a source of electric energy, electric circuits connecting said source with each of said solenoids, a vehicle speed responsive two-way switch to selectively energize one of said circuits, a second switch adapted to break both circuits, said second switch being adapted to be closed when said throttle is urged toward a closed position, said switches being series connected whereby the ends of said cylinder alternately have air withdrawn therefrom by manifold suction and said piston is moved toward one end of said cylinder by differential pressure and whereby movement of said piston is dependent upon the concurrent closing of said switches and the direction of motion of said piston is dependent upon the vehicle speed, means connecting said piston with said clutch whereby movement of said piston in either direction disengages and reengages said clutch, means connecting said piston with said first means whereby movement of said piston in one direction selects said first speed ratio drive and movement of said piston in the other direction selects said second speed ratio drive and means to time the selection of said speed ratio drive to occur during the interval when said clutch is disengaged.

17. In a drive for a motor vehicle having an engine provided with a driver controlled throttle and a driven shaft adapted to transmit drive from the engine to the vehicle; change speed mechanism drivingly connected with said driven shaft for driving the driven shaft from the engine at a slow speed and for driving the driven shaft from the engine at a speed which is relatively faster than the slow speed, torque transmitting means operatively connecting said engine and said change speed mechanism, said torque transmitting means comprising a disengageable clutch and a fluid coupling, a movable member, automatic control means for effecting movement of said member by inducing a pressure differential on opposite sides thereof in response to a substantially closed throttle condition and predetermined vehicle speed conditions, and motion transmitting means operatively connecting said member and said clutch and said member and said change speed mechanism and adapted to disengage said clutch, change the speed ratio drive of said change speed mechanism from one of said speeds to the other and accommodate reengagement of said clutch when said member is moved, such that said vehicle may be operated in successive cycles of initially accelerating the vehicle from rest in said slow speed drive with automatic clutch disengagement, a step-up to said fast speed drive and clutch reengagement occurring when said throttle is released by the driver under predetermined vehicle speed conditions, operating the vehicle in said fast speed drive above a predetermined speed and retarding the vehicle speed by permitting the throttle to approach a closed position and having a clutch disengagement, a stepdown to said slow speed drive and clutch reengagement automatically occur with the vehicle in motion when predetermined vehicle speed conditions are obtained and then bringing the vehicle to rest with the engine idling by accommodation of the fluid coupling.

GEORGE AINSWORTH.

References Cited in the file of this patent

UNITED STATES PATENTS

| Number | Name | Date |
|---|---|---|
| 2,051,553 | Fleischel | Aug. 18, 1936 |
| 2,098,691 | Neff | Nov. 9, 1937 |
| 2,129,259 | Boughton | Sept. 6, 1938 |
| 2,212,282 | Buskirk | Aug. 20, 1940 |
| 2,222,913 | Pescara | Nov. 26, 1940 |
| 2,237,159 | Neff | Apr. 1, 1941 |
| 2,247,920 | Neff | July 1, 1941 |
| 2,257,511 | Neff | Sept. 30, 1941 |